(12) United States Patent
Grossmann et al.

(10) Patent No.: US 10,594,234 B2
(45) Date of Patent: Mar. 17, 2020

(54) METHOD AND DEVICE FOR OPERATING AN ELECTRICALLY COMMUTATED MACHINE

(71) Applicant: Robert Bosch GmbH, Stuttgart (DE)

(72) Inventors: Alex Grossmann, Leonberg (DE); Simon Dierolf, Owen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/131,748

(22) Filed: Sep. 14, 2018

(65) Prior Publication Data
US 2019/0089276 A1    Mar. 21, 2019

(30) Foreign Application Priority Data
Sep. 21, 2017   (DE) .................. 10 2017 216 707

(51) Int. Cl.
*H02P 6/16*     (2016.01)
*H02K 7/116*    (2006.01)
*F16H 57/00*    (2012.01)

(52) U.S. Cl.
CPC ............. *H02P 6/16* (2013.01); *F16H 57/00* (2013.01); *H02K 7/116* (2013.01)

(58) Field of Classification Search
CPC .................................................... H02P 6/16
USPC ....................................... 318/400.01, 700
See application file for complete search history.

(56) References Cited

U.S. PATENT DOCUMENTS

| 6,879,125 | B2 * | 4/2005 | Akatsu | B60L 15/025 318/495 |
| 8,666,579 | B2 * | 3/2014 | Akutsu | B60K 6/26 701/22 |
| 9,283,950 | B2 * | 3/2016 | Yamamoto | B60K 6/48 |

* cited by examiner

*Primary Examiner* — David Luo
(74) *Attorney, Agent, or Firm* — Norton Rose Fulbright US LLP; Gerard Messina

(57) ABSTRACT

A method and device for operating an electrically commutated machine having a rotor on which a first gear of a transmission can be situated, wherein a comparison value is determined as a function of an instantaneous angular position of a second gear of the transmission that is capable of being connected to the first gear for the transmission of torque, and a target value for an manipulated variable of the electrically commutated machine is determined as a function of the result of a comparison of the comparison value with an instantaneous value of an operating variable of the electrically commutated machine.

6 Claims, 3 Drawing Sheets

METHOD AND DEVICE FOR OPERATING AN ELECTRICALLY COMMUTATED MACHINE

RELATED APPLICATION INFORMATION

The present application claims priority to and the benefit of German patent application no. 10 2017 216 707.6, which was filed in Germany on Sep. 21, 2017, the disclosure which is incorporated herein by reference.

FIELD OF THE INVENTION

The present invention relates to a method and to a device for operating an electrically commutated machine.

BACKGROUND INFORMATION

Conventional actuators (actuating drives) that include an electronically commutated motor are connected via a transmission to the actual actuating element, in particular an actuator lever.

For the operation of these actuators, it is important to know a position of the rotor of the commutated motor and an absolute position of the actuator lever.

This can be achieved through the direct acquisition of the absolute position of the actuator lever and of the rotor using two sensors.

If only one sensor is used, this sensor can acquire either the absolute position of the actuator lever or the absolute position of the rotor. In the first case, the absolute position of the rotor can be determined as a function of a gear ratio of the transmission. In the second case, the absolute position of the actuator lever can be determined as a function of the transmission gear ratio.

In order to produce high torques at the actuator lever using electrically commutated motors having a low torque, a plurality of transmission stages are connected in series in order to produce a high transmission gear ratio. Due to the play in the transmission, at these high transmission gear ratios there occur high degrees of imprecision in the determination of the absolute position using only one sensor. If one of the gears can completely rotate more than once during a rotation of another gear, an unambiguous assignment of the absolute positions is not possible.

Therefore, in conventional sensor referencing with one sensor, during a reference trip the sensor acquires the absolute position of the rotor and determines the absolute position of the actuator lever by arriving at a mechanically characteristic point, e.g. a stop, and acquiring the relative movement beginning from this point. This is a reliable and precise method for determining the absolute position of the actuator lever.

However, this is time-intensive.

Therefore, it is desirable to provide an absolute position determination using one sensor that is improved in comparison therewith.

SUMMARY OF THE INVENTION

This is achieved by a method for operating an electrically commutated machine and by a corresponding device according to the descriptions herein.

The method for operating the electrically commutated machine having a rotor on which a first gear of a transmission can be situated provides that a comparison value is determined as a function of an instantaneous angular position of a second gear of the transmission that can be connected to the first gear in order to transmit torque, and a target value for an manipulated variable of the electrically commutated machine is determined as a function of the result of a comparison of the comparison value to an instantaneous value of an operating variable of the electrically commutated machine. The electrically commutated machine can be a generator or a motor. The operating variable is for example the manipulated variable itself. The sensor in the transmission does not directly acquire the absolute position of the rotor. Due to a transmission gear ratio, the first gear does not rotate synchronously with the second gear. The instantaneous angular position of the second gear is therefore not unambiguously assignable to an actual rotor position if the one gear can be in a first rotation while the second gear is already in a second, or even higher, rotation. Due to possible deviation, during the controlling of the electrically commutated machine commutation errors can occur based on the instantaneous angular position of the second gear. Commutation errors have the result that the operating variable differs from the comparison value at the time of comparison. For example, the manipulated variable exceeds a threshold value. If the instantaneous value of the operating variable exceeds the threshold value, a deviation is determined, and the manipulated variable is modified. Otherwise, the manipulated variable is taken over unchanged.

Advantageously, an actuator lever is capable of being connected to the second gear for the transmission of torque via a third gear, a belt drive, a chain drive, or a worm drive, an absolute position of the actuator lever being determined as a function of the result of the comparison. Through this configuration of the sensor, the influence of the transmission play is reduced, and the precision of the absolute position determination of the actuator lever is improved.

Advantageously, between the first gear and the second gear there can be situated at least one further gear via which the torque is transmitted from the first gear to the second gear, or between the second gear and the third gear there can be situated at least one further gear via which the torque is transmitted between the second gear and the third gear. Through this configuration of the sensor, the determination of the absolute position in such a multi-stage transmission is improved.

Advantageously, as a function of the information about the instantaneous angular position of the second gear, and as a function of information about a transmission gear ratio between the first gear and the second gear, information is determined about an absolute position of the first gear or of the rotor, and/or as a function of the information about the instantaneous angular position of the second gear, and as a function of information about the transmission gear ratio between the second gear and the third gear, information is determined about an absolute position of the third gear or of the actuator lever. In this way, the respective absolute position is capable of being precisely determined.

With regard to the device, a control device is configured to operate an electrically commutated machine, the electrically commutated machine having a rotor on which a first gear of a transmission is situated, a second gear of the transmission being capable of being connected to the first gear for the transmission of torque, the control device being configured to determine a comparison value as a function of an instantaneous angular position, and, as a function of the result of a comparison of the comparison value with an instantaneous value of an operating variable of the electrically commutated machine, to determine a target value for an manipulated variable of the electrically commutated machine. This device has an improved controlling.

Advantageously, an actuator lever is capable of being connected to the second gear for the transmission of torque via a third gear, a belt drive, a chain drive, or a worm drive, the control device being fashioned to determine an absolute position of the actuator lever as a function of the result of the comparison. Through this configuration of the sensor, the influence of the transmission play is reduced, and the precision of the absolute position determination of the actuator lever is improved.

Advantageously, between the first gear and the second gear there is situated at least one additional gear via which the torque is transmitted from the first gear to the second gear, or between the second gear and the third gear there is situated at least one additional gear via which the torque is transmitted between the second gear and the third gear. Through this configuration of the sensor, the determination of the absolute position in such a multi-stage transmission is improved.

Advantageously, information can be determined about an absolute position of the first gear or of the rotor as a function of the information about the instantaneous angular position of the second gear and as a function of information about a transmission gear ratio between the first gear and the second gear, and/or information can be determined about an absolute position of the third gear or of the actuator lever as a function of the information about the instantaneous angular position of the second gear and as a function of information about the transmission gear ratio between the second gear and the third gear. In this way, the respective absolute position can be precisely determined.

Further advantageous embodiments result from the following description and from the drawings.

DETAILED DESCRIPTION

Figure 1:
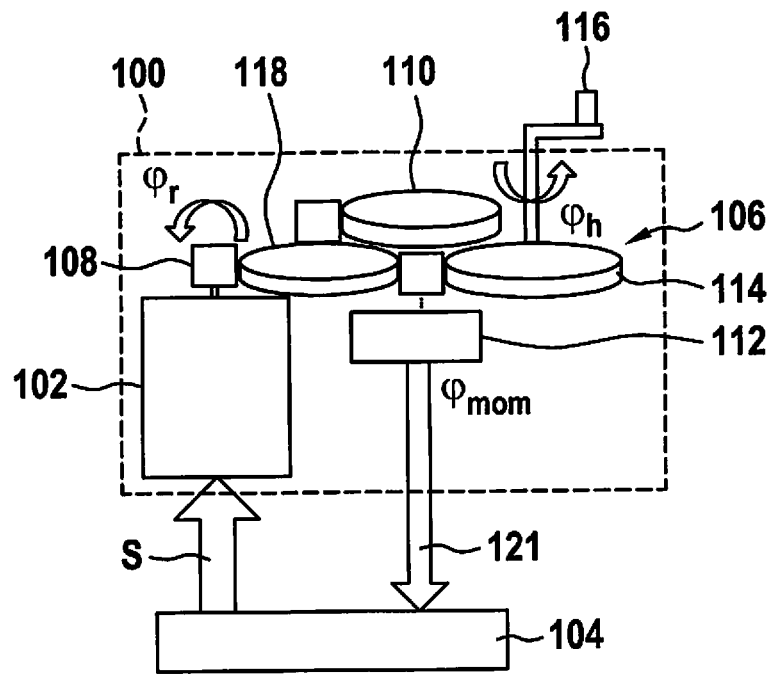
FIG. 1 schematically shows an actuator.

FIG. 1 schematically shows an actuator 100. Actuator 100 includes an electrically commutated machine 102. Electrically commutated machine 102 is realized as a motor that is capable of being controlled by a control device 104.

Actuator 100 includes a transmission 106.

Electrically commutated machine 102 includes a rotor on which there is situated a first gear 108 of transmission 106. The rotor has $p_{Pol}$ pole pairs. In the example, $p_{Pol}=2$.

Actuator 100 includes a second gear 110 and a sensor 112. Sensor 112 is configured to acquire an instantaneous angular position $\varphi_{mom}$ of second gear 110. Sensor 112 is for example a position sensor. First gear 108 and second gear 110 are connected for the transmission of torque. Actuator 100 has a third gear 114. Third gear 114 and second gear 110 are connected for the transmission of torque. An actuator lever 116 is situated on third gear 114.

Between first gear 108 and second gear 110, there can be situated at least one further gear via which the torque is transmitted from first gear 108 to second gear 110. In the example, there is a fourth gear 118. Between second gear 110 and third gear 114 there can be situated at least one additional gear via which the torque is transmitted between second gear 110 and third gear 114.

In the example, second gear 110, third gear 114, and fourth gear 118 each have two spur gears that are connected to one another in rotationally fixed fashion and that have different circumferences. The spur gears of second gear 110, of third gear 114, and of fourth gear 118 are connected in series as a reduction gearing in the example. In this way, a high torque can be produced at actuator lever 116 by the electrically commutated motor.

Control device 104 is configured to determine a comparison value as a function of the instantaneous angular position $\varphi_{mom}$ of second gear 106 of transmission 108.

Control device 104 is configured to determine a target value $S_{soll}$ for an manipulated variable S of electrically commutated machine 102 as a function of the result of a comparison of the comparison value with an instantaneous value of an operating variable of electrically commutated machine 102. In the example, the operating variable is manipulated variable S. The operating variable can characterize an exciter current or its zero crossings.

Control device 104 may be configured to determine an absolute position of actuator lever 116 as a function of the result of the comparison.

Control device 104 may be configured to determine information about an absolute position of first gear 108 or of the rotor as a function of the information about the instantaneous angular position $\varphi_{mom}$ of second gear 110 and as a function of information about a transmission gear ratio $i_{Rot}$ of transmission 106 between first gear 108 and second gear 110. In the example, an absolute position of first gear 108 corresponds to that of the rotor. In the following, both are designated as rotor position $\varphi_{rot}$. In the example, $i_{Rot}=16.347$ is used.

Through the configuration of sensor 112 for the acquisition of instantaneous angular position $\varphi_{mom}$ of second gear 110, the influence of play in transmission 106 on the determined rotor position $\varphi_{rot}$ is reduced, and the precision of the determined rotor position $\varphi_{rot}$ is improved.

Control device 104 may be configured to determine information about an absolute position of third gear 114 or of actuator lever 116 as a function of the information about instantaneous angular position $\varphi_{mom}$ of second gear 110 and as a function of information about a transmission gear ratio $I_{Akt}$ of transmission 106 between second gear 110 and third gear 114. In the example, an absolute position of third gear 114 corresponds to that of actuator lever 116. In the following, both are designated actuator position $\varphi_h$.

Through the configuration of sensor 112 for the acquisition of instantaneous angular position $\varphi_{mom}$ of second gear 110, the influence of play of transmission 106 on the determined absolute position of third gear 114 or of actuator lever 116 is reduced and the precision of the determined actuator position $\varphi_h$ is improved.

Figure 2:
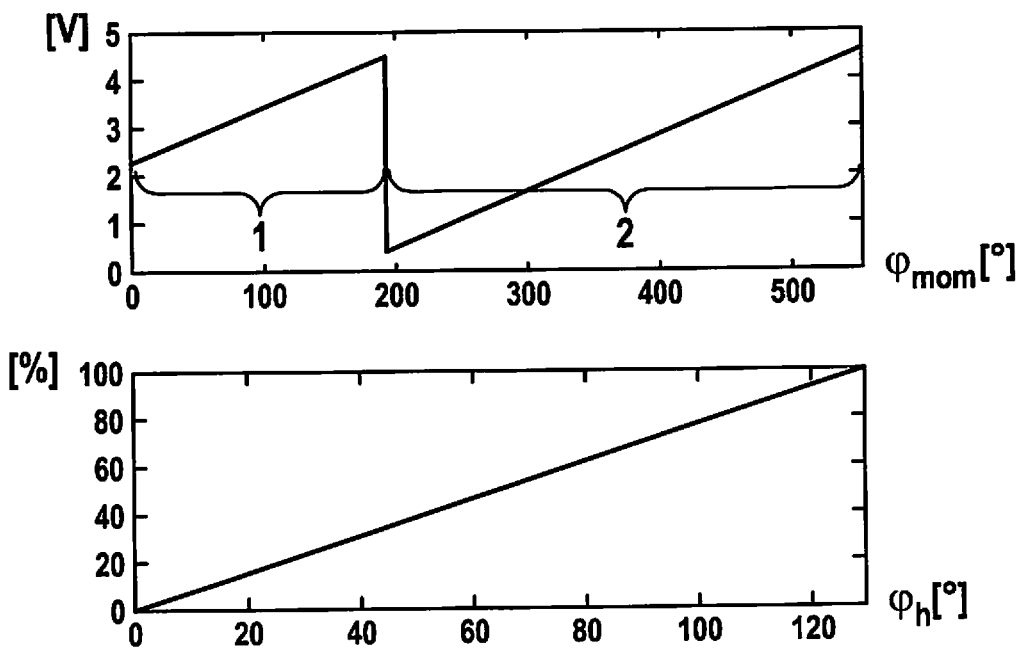
FIG. 2 schematically shows a signal curve during operation of the actuator with an electrically commutated machine.

FIG. 2 schematically shows a signal curve during operation of actuator 100 with electrically commutated machine 102.

In the upper part of FIG. 2, a sample curve of a sensor voltage signal for a position determination of actuator lever 116 is plotted over the instantaneous angular position $\varphi_{mom}$ of second gear 110 between 0 and 560°. The sensor voltage signal is an example of a signal for determination of position. In a first period 1, the sensor voltage signal increases from a value between 2 and 3 V at $\varphi_{mom}=0°$ to a value above 4 V at $\varphi_{mom}=200°$. There then begins a second period 2 at a value between 0 and 1 V. Here the sensor voltage signal jumps. In the second period 2, the sensor voltage signal climbs to the same value above 4 V at $\varphi_{mom}=560°$. The rise within first period 1 is monotonic. The rise within second period 2 is monotonic.

The lower part of FIG. 2 shows the curve of a percentual actuator deflection over actuator position $\varphi_h$ synchronous to the curve of the sensor voltage signal in the upper part of FIG. 2. The percentual actuator deflection is normed to a maximum possible actuator deflection at an actuator position $\varphi_h=130°$. The percentual actuator deflection increases monotonically from 0% at actuator position $\varphi_h=0°$ to a percentual actuator deflection of 100% at actuator position $\varphi_h=130°$.

In this example, the sensor voltage signal is ambiguous, because the same sensor voltage values could occur both in first period 1 and in second period 2.

Figure 3:
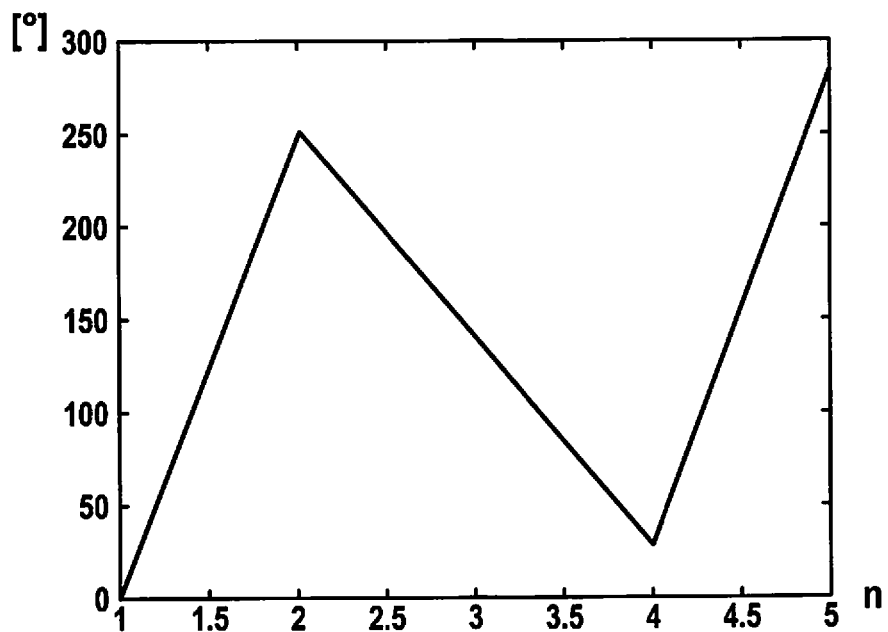
FIG. 3 shows a curve of an effective commutation error as a function of a number of rotations of a sensor gear of the actuator.

FIG. 3 shows a curve of a resulting effective commutation error as a function of a number n of rotations of a sensor gear of the actuator for the example of five rotations of second gear 114 as sensor gear. Given a rotation of second gear 114 and beginning from an effective commutation error of 0°, the effective commutation error increases monotonically until the end of the second rotation of second gear 114, to an effective commutation error, relative to the ideal commutation at 360° el a=0°el, of −109.836° el at 250.164 degrees in period 2. Up to the end of the fourth rotation of second gear 114, the effective commutation error again climbs to an effective commutation error of 329.530° at 30.47° el in period 4. Subsequently, the effective commutation error in the example decreases until the end of the fifth rotation of second gear 114, to 80° el at 280° el in period 5. For the effectiveness of the method, it is not decisively important that the curve be monotonic segment by segment. The representation in FIG. 3 shows essentially that there is only one sensor period, namely period 1, that actually results in a commutation error of zero. All the other sensor periods have a commutation error of, in the example, 329.530° el at 30.47° el to 80° el at 280° el. In the example, only the two adjacent periods [0, 1, 2] are in question, because the mechanical range of movement is limited to these periods. In this way, commutation errors occur that become significantly larger, namely, in the example, 250° el or 280° el in period 5. In the example, period 5 corresponds to period 0.

The relative commutation errors that occur between respectively adjacent sensor signal periods can be ascertained using the following equation:

$$\varphi_{rel}=360° \bmod(i_{Rot}*n_{Pol}*x,1)$$

with $$x \in N, x<1(1+\varphi_{h,max}/360° *i_{Ger}/i_{Rot})$$

$\varphi_{h,max}$: maximum stroke of the drive lever [°]
$p_{Pol}$: pole pair number of the electrically commutated machine $$i_{Ger}=i_{Rot}*i_{Akt}$$

In the example, $\varphi_{h,max}=130°$. So x=2 and the relative commutation error is
$\varphi_{rel}=360°$ mod (16.347*2, 1)=250.164°=−109.836°.

If, after control device 104 is activated, actuator lever 116 is in a period of the sensor signal different from the expected period, then the quality of the commutation on the basis of this sensor signal is drastically worsened.

Manipulated variable S of the electrically commutated machine influences for example the exciter current, if the electrically commutated machine is a motor. In a multi-phase motor, an manipulated variable can be specified for each of the phases. Manipulated variable S is for example an exciter current, or influences switching times at which the exciter current is switched on or off. A worsening of the commutation quality is reliably recognized through a diagnostic method, for example a monitoring of manipulated variable S. This manipulated variable monitoring can for example be the comparison of manipulated variable S with the comparison value. The comparison value is based for example on a target exciter current curve. An additional temporal debouncing can be provided.

The presence of a large commutation error causes an exceeding of the comparison value of manipulated variable S, which can trigger particular processes such as substitution reactions.

If the system is switched on with the first possible period 1 and the monitoring of manipulated variable S recognizes a non-plausible actuator behavior, and thus a poor commutation, the next period 2 is used for the assignment of the sensor signal for the rotor position Rot in the commutation, and the actuator behavior is rechecked.

Ideally, the transmission gear ratios $i_{Rot}$ and $i_{Akt}$, and the mechanical range of movement of actuator lever 116, are chosen such that no more than two periods can occur. Then, after incrementing the period upward, the actually present period is already found. Otherwise, the manipulated variable also has to be monitored for the period 2 in order to also check a period 3 if necessary. This process is then repeated over all possible periods until a plausible actuator behavior can be confirmed. This process is referred to as sensor referencing in the following.

This enables a reliable recognition of a false sensor period.

Figure 4:
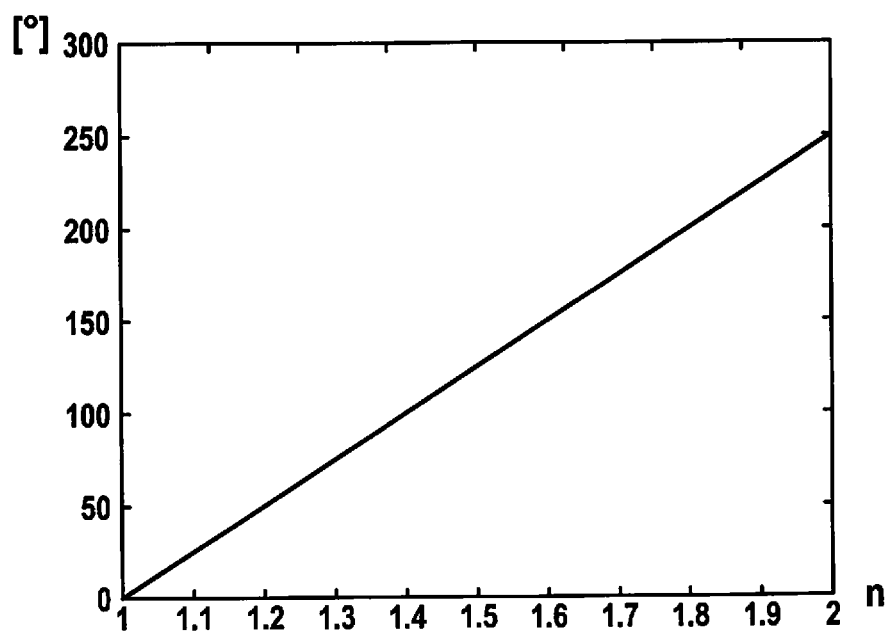
FIG. 4 shows a segment of the curve of the effective commutation error as a function of the number of rotations of the sensor gear.

In FIG. 4, a segment is shown of the curve of the effective commutation error of FIG. 3 for the second rotation of the sensor gear. This curve occurs in an example in which the actuator position can assume only values of $\varphi h=0°$ to $\varphi h=130°$. This is achieved for example through mechanical stops for actuator lever 116. In this range, the curve of the effective commutation error rises monotonically. A range of travel of actuator lever 116 is thus limited. In this way, the assignment of the instantaneous angular position $\varphi_{mom}$ and of the rotor position $\varphi_{rot}$ is unambiguously possible for each of the actuator positions $\varphi_h$ shown in FIG. 2.

Figure 5:
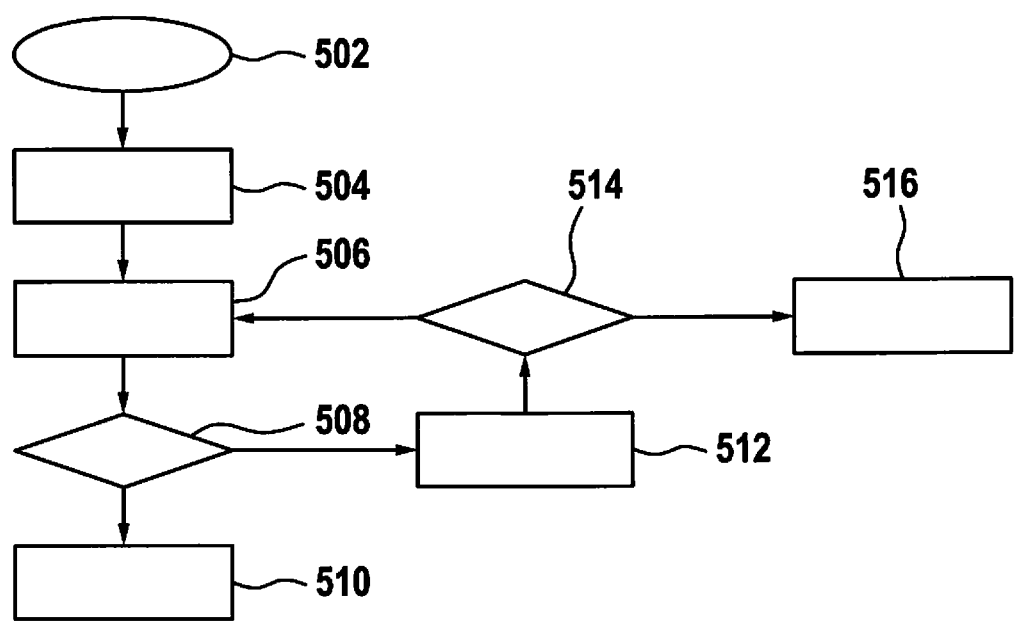
FIG. 5 shows a flow diagram with steps from a method for operating the electrically commutated machine.

The unambiguous assignment is described on the basis of a method for operating an electrically commutated machine, with reference to FIG. 5.

FIG. 5 shows a flow diagram with steps from the method for operating electrically commutated machine 100.

In a step 502, control device 104 is switched on.
Subsequently, a step 504 is carried out.
In step 504, a variable is initialized that indicates the number of the period. For example, the variable P=1 is set in order to carry out the sensor referencing assuming the assignment in period 1.
Subsequently, a step 506 is carried out.
In step 506, a positional regulation and a sensor referencing mode are activated. Positional regulation means a controlling of electrically commutated machine 100 for the targeted modification of the absolute position of actuator lever 116. For this purpose, a corresponding torque generation is provided by electrically commutated machine 100 with a small commutation error.

Subsequently, a step 508 is carried out.

In step 508, the comparison value is determined. As a function of the result of the comparison of the comparison value with the instantaneous value of the operating variable of electrically commutated machine 100, a target value is determined for an manipulated variable of electrically commutated machine 100.

In the example, the manipulated variable for electrically commutated machine 100 is used as operating variable. In the example, it is checked whether the manipulated variable exceeds the threshold value. If the manipulated variable does not exceed the threshold value, a step 510 is carried out. Otherwise, a step 512 is carried out.

In step 510, the normal operation of the positional regulation is taken up, and the sensor referencing mode is deactivated. This means that in step 510 a case is handled in which one of the periods led to an unambiguous assignment. With this, the absolute positions, in particular actuator position $\varphi_h$ and rotor position $\varphi_{rot}$, are determined unambiguously and particularly precisely as a function of the instantaneous angular position $\varphi_{mom}$.

In step 512, the variable that indicates the number of the period is incremented upward. For example, the variable P=P+1 is set in order to carry out the sensor referencing with the assumption of the assignment in the respective next period. In the example, only two periods are considered.

Subsequently, a step 514 is carried out.

In step 514, it is checked whether all periods have already been checked. For example, it is checked whether the variable P is less than or equal to the maximum number of periods. In the example, it is checked whether P<=2.

If all periods have been checked, a step 516 is carried out. Otherwise, step 506 is carried out.

In step 516, the positional regulation is deactivated and a secure state is brought about. This means that in step 516 an error case is handled in which none of the periods resulted in an unambiguous assignment.

The example describes the functioning using a gear transmission. For the present invention, the number of gears in the transmission is not important. The relations described in the example of the mechanical stroke of actuator lever 116, i.e. its absolute position, and the transmission gear ratio between sensor 112 and electrically commutated machine 102 also hold for other transmissions. For example, a worm drive, a chain drive, or a belt drive may be used.

What is claimed is:

1. A method for operating an electrically commutated machine having a rotor on which a first gear of a transmission is situatable, the method comprising:
    determining a comparison value as a function of an instantaneous angular position of a second gear of the transmission that is connectable to the first gear for transmitting torque; and
    determining a target value for an manipulated variable of the electrically commutated machine as a function of the result of a comparison of the comparison value with an instantaneous value of an operating variable of the electrically commutated machine;
    wherein an actuator lever is connectable to the second gear for the transmission of the torque via a third gear, a belt drive, a chain drive, or a worm drive, an absolute position of the actuator lever being determined as a function of the result of the comparison.

2. The method of claim 1, wherein between the first gear and the second gear, at least one further gear is situatable via which the torque is transmitted from the first gear to the second gear, or between the second gear and the third gear at least one further gear is situatable via which the torque is transmitted between the second gear and the third gear.

3. The method of claim 1, wherein information about an absolute position of the first gear or of the rotor is determined as a function of the information about the instantaneous angular position of the second gear and as a function of information about a transmission gear ratio between the first gear and the second gear, and/or information about an absolute position of the third gear or of the actuator lever is determined as a function of the information about the instantaneous angular position of the second gear and as a function of information about the transmission gear ratio between the second gear and the third gear.

4. A device for operating an electrically commutated machine, comprising:
    a control device configured to operate the electrically commutated machine, wherein the electrically commutated machine has a rotor on which there is situated a first gear of a transmission, a second gear of the transmission being connectable to the first gear for transmitting torque;
    wherein the control device is configured to determine a comparison value as a function of an instantaneous angular position and to determine a target value for an manipulated variable of the electrically commutated machine as a function of the result of a comparison of the comparison value with an instantaneous value of an operating variable of the electrically commutated machine;
    wherein an actuator lever is connectable to the second gear for transmitting the torque via a third gear, a belt drive, a chain drive, or a worm drive, and wherein the control device is configured to determine an absolute position of the actuator lever as a function of the result of the comparison.

5. The device of claim 4, wherein between the first gear and the second gear there is situated at least one further gear via which the torque is transmitted from the first gear to the second gear, or that between the second gear and the third gear there is situated at least one further gear via which the torque is transmitted between the second gear and the third gear.

6. The device of claim 4, wherein information about an absolute position of the first gear or of the rotor is determined as a function of the information about the instantaneous angular position of the second gear and as a function of information about a transmission gear ratio between the first gear and the second gear, and/or information about an absolute position of the third gear or of the actuator lever is determined as a function of the information about the instantaneous angular position of the second gear and as a function of information about a transmission gear ratio between the second gear and the third gear.

* * * * *